Patented Dec. 17, 1946

2,412,557

UNITED STATES PATENT OFFICE 2,412,557

LUBRICATING OILS

Charles M. Blair, Jr., Webster Groves, Mo., assignor to Petrolite Corporation, Ltd., Wilmington, Del., a corporation of Delaware No Drawing. Original application October 16, 1944, Serial No. 558,949. Divided and this application April 20, 1945, Serial No. 589,463

8 Claims. (Cl. 252—51.5)

This application is a division of my pending application Serial No. 558,949, filed October 16, 1944, for New chemical product and method of manufacturing same, and relates to a new composition of matter comprising a lubricating oil and a new chemical product consisting of polyamide and polyamide compounds of relatively high molecular weight. The new chemical product above referred to may be prepared by reacting an alpha-beta, unsaturated acid or anhydride with an unsaturated amine of the kind to be described, under conditions which cause polymerization of the amide or imide initially formed.

The preparation of polymers of the reaction of multifunctional acids and multifunctional amines, is an old and well known art, exemplified, for example, by the reaction between ethylene diamine and adipic acid. Preferably, the new chemical product that forms part of my new composition of matter, is prepared from reactants in which polyfunctionality is not dependent on the presence of more than one carboxyl radical in the molecule, or more than one amino radical. If such plurality of carboxyl radicals of plurality of amino radicals are present, it is purely incidental. The polymers herein contemplated are dependent on the functionality of the unsaturated ethylene radical of the alpha-beta acid or anhydride on the one hand, and on the polyfunctionality of the unsaturated amine on the other hand, based on the presence of the amino radical, and additionally, on the functionality of the unsaturated ethylene radical which may enter into reaction per se, or which may activate a hydrogen atom attached to a carbon atom in a position alpha to, or perhaps, even beta to the unsaturated linkage. It happens that dicarboxy, alpha-beta, ethylenic acids or their anhydrides, such as maleic anhydride, are most readily available, and thus are most conveniently employed. However, in combination with such polycarboxy acid compound, it is preferred that the unsaturated amine contain only one amino radical. Monocarboxy acids may be employed, and similarly, unsaturated polyamino compounds may be used, but such reactants are not commonly available at the present time.

My present invention contemplates polymeric compounds derivable by reaction between an alpha-beta, ethylenic acid or anhydride and an unsaturated primary or secondary amine, in which the unsaturation is ethylenic and the ethylenic carbon atom nearest to the amino nitrogen atom is separated from said nitrogen atom by at least four singly bonded carbon atoms. The nature of the reaction is not clearly understood and is not readily explainable in terms of well known organic reactions. However, a tentative theory of the reaction mechanism and of the structure of the products will be given below.

Acidic reactants found useful in the preparation of the present products, are the alpha-beta, unsaturated acids and anhydrides which do not contain a vinyl group, especially those containing less than 10 carbon atoms. Examples of such acids and anhydrides are crotonic acid, maleic acid, citraconic acid, glutaconic acid, aconitic acid, itaconic acid, mesaconic acid, maleic anhydride, citraconic anhydride and itaconic anhydride.

The condensation of esters and amides of carboxylic acids containing a vinyl group, such as those of acrylic and methacrylic acids, is relatively well known and understood. The present products are prepared by a reaction which apparently differs from ordinary olefine polymerization, such as is involved in the acrylate polymerization. Such vinyl polymers are not contemplated herein.

These acids may be monobasic, or polybasic, including dibasic. Because of their low cost and availability in commercial quantities, maleic anhydride, fumaric acid and citraconic anhydride, are especially useful, and products obtained with these reactants will be used below to illustrate the present invention.

Suitable amines for use in preparing the new chemical product previously referred to are the unsaturated primary and secondary amines, in which the unsaturation occurs in an aliphatic or cycloaliphatic residue, and in which the ethylenic carbon atom nearest to the amino nitrogen is separated from said nitrogen atom by at least four singly bonded carbon atoms. Such amines may be aliphatic, alicyclic, mixed aliphatic-alicyclic, alkylaromatic, alicyclic-aromatic, or other containing aliphatic, alicyclic and aromatic residues, and in which the hydrocarbon residues attached to the amino nitrogen contain 8 or more and less than 32 carbon atoms. As stated above, suitable amines must have an ethylenic unsaturation removed by four singly bonded carbon atoms from the amino nitrogen; however, in applying this restriction, aromatic ring carbons are to be considered as singly bonded. Examples, of suitable amines include oleylamine, dioleylamine, phenyloleylamine, oleylaniline, p-decenylcyclohexylamine, dihydroabietylamine, p-1-decenylaniline, N-p-decenylcyclohexylaniline, etc. Such amines may have one or more amino groups per molecule, but the preferred reactants, because of cost, are monoamines. Where a secondary amine is employed, it is necessary that only one of the aliphatic or cycloaliphatic radicals attached to the amino nitrogen be unsaturated. The unsaturated amine may contain one or more carbon-to-carbon double bonds. The preferred amines are aliphatic, cycloaliphatic and alkylcycloaliphatic amines which contain 8 or more carbon atoms and less than 32 carbon atoms in each hydrocarbon residue attached to the amino nitrogen. Examples of preferred amines are: 1-amino-octene-5, 1-aminodecene-9, oleylamine, linileylamine, abietylamine, dihydroabietylamine, erucylamine, p-1-decenylcyclohexylamine, dioleylamine, n-hexadecyl-noctadecenylamine, unsaturated secondary amines obtained as a by-product in the manufacture of primary amines from red oil, commercial mixtures of unsaturated primary amines derived from fatty oils, etc.

In preparing the new chemical product that forms part of my new composition of matter, the choice of the relative number of moles of the reactants is somewhat variable. Under suitable conditions, at least one mole of alpha-beta, ethylenic acid appears to be able to combine additively with an amine having one carbon-to-carbon double bond, while simultaneously condensing with the amino group to yield amide or imide linkages. Actually, experiment shows that two alpha-beta ethylenic acid molecules may combine additively with an amine having one double bond, while three or more moles may combine with an amine having two double bonds in a single aliphatic chain or cycloaliphatic ring. With secondary amines containing two unsaturated aliphatic or cycloaliphatic groups, it is apparent that four or more moles of alpha-beta, ethylenic acid may combine. Usually, the present products will be prepared from reactants in which the ratio of moles of alpha-beta, ethylenic acid, to moles of unsaturated amine is within the range 0.5 to 5.

To prepare said new chemical product the desired alpha-beta, ethylenic acid is reacted with the desired unsaturated amine at a temperature which may range from about 100° C. to about 250° C. for a period of several hours. The reaction appears to involve both amide and imide formation, and addition at or near a double bond of the unsaturated reactants. Amidification catalysts, such as traces of alkali, may be employed. Olefine polymerization catalysts, such as benzoyl peroxide may also be employed, but such do not, in general, greatly affect the rate of reaction and contribute to the formation of impurities.

To obtain the highest degree of polymerization in the shortest period of time, certain reaction conditions have been determined to be of great importance. The determination of these reaction conditions actually constitutes an invention within an invention, in that it makes possible the preparation of the most desirable products with the minimum of time and effort. In particular, it has been found that polymerization is promoted by passing through the mixture, during reaction, a slow stream of oxygen or oxygen-containing gas, such as air.

The beneficial effect of this operation appears to arise directly from the oxygen in the gas used. If nitrogen, hydrogen, or other oxygen-free gases are passed through the mixture, the rate of polymerization is not appreciably increased. Efforts to find a catalyst comparable to oxygen have so far failed.

When employing oxygen or air as a catalyst, the temperatures of reaction may vary over rather wide limits, but best results are usually obtained within the range of 150° C. to 220° C. With reactants that boil within or below this temperature range, it is desirable to carry out the reaction under pressure, or to conduct the reaction at a lower temperature until amide or imide formation has produced an intermediate of higher boiling point. The temperature may then be increased to a higher value. The use of oxygen-containing gas as a reaction catalyst leads to some concomitant oxidation which may take place to an objectionable degree, if extremely high temperatures are used.

The following examples will serve to illustrate how chemical products or compounds of the kind above described may be prepared or produced.

CHEMICAL PRODUCT

Example 1

54 parts of crude octadecenylamine (iodine No.=78) and 20 parts of maleic anhydride were heated and stirred in a vessel equipped with a gas inlet tube, condenser and water trap. The temperature was held at 190° C. for 2 hours. A slow stream of air was then started through the reaction mixture, the temperature was raised slowly to 210° C. and was held at this point for 21 hours.

The product at this point was a red, viscous, almost rubbery oil, which was clearly soluble in kerosene.

CHEMICAL PRODUCT

Example 2

54 parts of commercial n-octadecyl-n-octadecenyl amine (iodine No.=45.4) and 10 parts of maleic anhydride were reacted as above.

The product was a dark, viscous oil when warm, only partly soluble in kerosene.

CHEMICAL PRODUCT

Example 3

23 parts of citraconic anhydride were substituted for the maleic anhydride in previous Example 1.

CHEMICAL PRODUCT

Example 4

40 parts of maleic anhydride were used in place of the 20 parts in previous Example 1. Heating at 210° C., while passing a slow air stream through the reaction mixture, was continued for 30 hours.

CHEMICAL PRODUCT

Example 5

24 parts of commercial fumaric acid were substituted for the maleic anhydride of previous Example 1.

The product was practically identical with that of Example 1.

CHEMICAL PRODUCT

Example 6

21.4 grams of purified oleyl amine (iodine No.=95.0) and 7.9 grams of pure maleic anhydride were reacted in a vapor-heated vessel equipped with gas inlet tube, viscosimeter tube, thermometer, water trap and condenser. The mixture was heated at 200±2° C. by means of boiling m-cresol. During the first part of the reaction a stream of dry methane was passed through the mixture. Later a slow stream of dry air was substituted for the methane. The viscosity of the reacting mixture was determined periodically by a procedure such as that described by Flory, J. A. C. S. 62, 105 (40). The following table summarizes the viscosities obtained at various periods, and also gives the molecular weights of a few samples, as determined cryoscopically in benzene.

| Total hours of heating | Gas being used | Viscosity of product (arbitrary units) | Average molecular weight of product |
|---|---|---|---|
| 5 | Methane | 1.33 | |
| 9 | do | 1.40 | 1,760 |
| 16 | do | 1.49 | |
| 27 | do | 1.56 | |
| 44 | do | 1.63 | |

REPLACED METHANE WITH AIR AT THIS POINT

| | | | |
|---|---|---|---|
| 52 | Air | 2.27 | 2,240 |
| 59 | do | 6.23 | |
| 67 | do | 17.20 | |
| 78 | do | | 3,020 |

The product was a clear, red, extremely viscous fluid. It was soluble in benzene and mineral spirits, and partly soluble in SAE 30 Pennsylvania motor oil.

The data clearly shows the effect of air in increasing the rate of polymerization. However, it is also clear that a considerable amount of polymerization is obtained in the absence of oxygen. The average molecular weight of the 9 hour sample corresponds to that of a molecule containing about 5 monomer units.

CHEMICAL PRODUCT

Example 7

100 parts of maleic anhydride and 270 parts of commercial oleyl amine were heated at 200° C. until refluxing ceased. The temperature was then raised to 240° C. and held for 4 hours. A product sample at this point had a cryoscopic molecular weight of 2,400.

CHEMICAL PRODUCT

Example 8

56 parts of commercial dihydroabietyl amine were substituted for the 54 parts of octadecenylamine employed in Example 1.

The product had practically no acid value and was a very viscous oil, soluble in lubricating oil.

It will now be noted that one of the above products, that of Example 2, was prepared from one molal proportion of a dibasic acid and one molal proportion of a monobasic secondary amine. Such products contain some free carboxyl groups. Analysis of the product of Example 2 indicates that somewhat less than the theoretical number of carboxylic acid groups remains. It is believed that this result may arise from some decarboxylation at the temperature of reaction, i. e., 210°

C. The product of Example 4 also contains free carboxylic acid groups.

Products containing free carboxylic acid groups may be reacted with alkalies, amines, heavy metal oxides, etc., to yield polymeric salts which have useful properties in addition to those of the polymers alone. Salts, such as the sodium salt of the product of Example 4, may be used as sludge dispersers or detergents in lubricating oil. The lead salt of the product of Example 2 may also be used as a thickening agent and a detergent in oils.

In general, products of the present invention which contain free carboxyl groups may be employed as such, as the metal or amine salt, as an amide, or in some cases, as the esters of mono-, di-, or polyhydric alcohols. When such carboxyl-containing products are reacted with a long chain amine or alcohol, especially useful products are obtained, which are made the subject of my co-pending application Serial No. 558,950, filed October 16, 1944.

The nature of the reaction which results in the formation of the new chemical product herein described, is not clearly understood, but it is believed that the alpha-beta, unsaturated acid reacts with the amine group of the amine, and also condenses, by proton transfer, with the unsaturated amine at an ethylenic carbon atom of same, or at a carbon atom near the double bond. The unsaturated amine undergoing condensation with a molecule of ethylenic acid, is probably linked by amide or imide formation to a different molecule of ethylenic acid; so a type of linear polyamide is formed. When the double bond of the unsaturated alcohol is nearer to the amino nitrogen than allowed by the conditions previously given, good yields of the desired products are not obtained. It is believed that this is the result of the formation of stable, cyclic, inner amides, rather than linear polyamides.

Various possible reactions which are believed might occur in the preparation of the new chemical product that forms part of my new composition of matter, are as follows, employing an unsaturated aliphatic primary amine and an alpha-beta, ethylenic, monocarboxy, aliphatic acid:

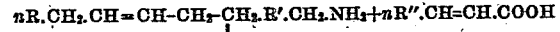

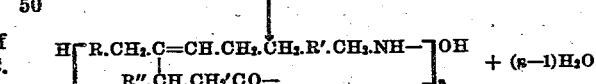

or

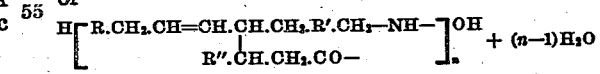

or

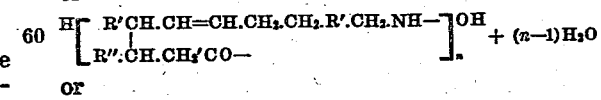

or

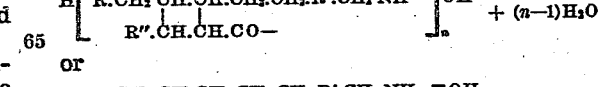

or

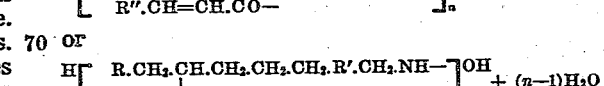

Where a dicarboxylic, alpha-beta ethylenic acid, such as maleic anhydride, is reacted with a primary, unsaturated amine, it is believed that reactions analogous to the above take place with the formation of polyimides. In this case the reaction analogous to the first one above would be:

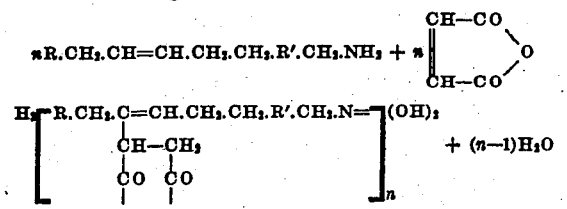

$$nR.CH_3.CH=CH.CH_3.CH_3.R'.CH_3.NH_2 + n \begin{array}{c} CH-CO \\ | \\ CH-CO \end{array} \Big\rangle O$$

$$H \!-\!\! \left[ \begin{array}{c} R.CH_3.C=CH.CH_3.CH_3.R'.CH_3.N= \\ | \\ CH-CH_3 \\ | \quad | \\ CO \quad CO \\ | \quad | \end{array} \right]_n \!\!(OH)_2 + (n-1)H_2O$$

Such a product would be a substituted polysuccinimide.

Where more than one mole of alpha-beta, ethylenic acid is reacted with a mole of unsaturated amine, similar reactions probably occur, with the attachment of two or more moles of ethylenic acid at points in the unsaturated chain of the amine at or near the double bond.

An imide may be looked upon as a special type of amide, or as a kind of double amide, since in an imide both of the original amino hydrogen atoms have been removed by reaction with a carboxyl group. For this reason, the term "amide" will be used in the claims in its broad sense to include groups or linkages of either the conventional monoamide or imide type.

In the above formula, R and R'' represent alkyl groups which contain one or more carbon atoms, and R' is an alkylene group which may contain one or more carbon atoms. $n$ is a whole number.

In addition to the above reactions, several others are conceivably possible. However, it is understood that the exact reactions are a matter of speculation or conjecture, and may vary, depending, in part, on the particular reactants selected. Such reactions are not to be construed as a limitation in any respect, but are submitted in order to show the diverse nature of the possible or probable reactions involved, and additionally, to indicate the inability adequately to portray the invention in terms of conventional chemical formulae.

My invention consists in using the chemical products above described as lubricating oil additives for increasing the viscosity index of such oils. As specific examples of my present invention, the following examples are given of a new composition of matter, consisting of a mixture of mineral oil and the polyamides or polyimides previously described.

COMPOSITION OF MATTER

*Example 1*

2% by weight of the product of previous Example 7, above, was added to a lubricating oil having a viscosity index of 60, and a viscosity at 210° F. of 46 seconds. The resulting clear oil solution had a viscosity index of 95 and a viscosity of 53 seconds at 210° F.

COMPOSITION OF MATTER

*Example 2*

2% by weight of the product of previous Example 3, above, was added to a lubricating oil having a viscosity index of 70 and a viscosity of 210° F. of 44.9 seconds. The resulting oil had a viscosity index of 90.0 and a viscosity at 210° F. of 48.5 seconds.

Greater or lesser effects on viscosity index than those illustrated above may be obtained by adding more or less reagent. Using a product of higher intrinsic viscosity, such as that of Chemical Product, Example 1, less reagent is required for a desired improvement in viscosity index. In general, the percentages of such products which will be employed, varies from as little as 0.025% to as much as 5%, or even more, depending upon the use to which the oil is to be put. Thus, one object of my invention is the preparation of such improved lubricating oils, or lubricating oil compositions, by adding not less than about 0.025%, or more than about 5% of the hereindescribed chemical products or compounds, to lubricating oils, such as are used in internal combustion engines.

The hereindescribed new chemical products that form parts of my new composition of matter, are, in general, unsaturated, as reaction does not remove all of the olefinic groups of the unsaturated reactants. If desired, these products may be hydrogenated to remove olefinic double bonds. Other chemical reactions may be employed to modify the properties of the polymers. For example, they may be treated with sulfur at elevated temperatures to form sulfurized polymers useful as antioxidants and film strength improves for petroleum or fatty oils, or they may be chlorinated, or they may be both sulfurized and chlorinated to yield useful additives for heavy duty oils.

Chemical products of the type herein contemplated are referred to as addition-condensation polymers. This is in conformity with nomenclature in Organic Chemistry, Gilman, 2nd edition, volume 1, page 702.

Said products are addition polymers in the sense that some intermolecular reaction occurs without the elimination of any atoms or groups, such reaction being that involved during the coupling of the alpha-beta, ethylenic acid to the unsaturated hydrocarbon group of the amine. Further, condensation occurs through the reaction of the carboxylic acid group with the amino group, yielding water as a product. In general, polymerization of the reactants employed will be possible only when both addition and condensation occur.

Having thus described my invention, what I claim as new and desire to secure by Letters Patent is:

1. A lubricating composition, comprising a lubricating oil and an unsaturated amine-alpha-beta, unsaturated carboxylic acid addition-condensation polymer; said amine containing at least one ethylenic unsaturation and having at least 4 singly bonded carbon atoms between the ethylenic double bond and the nearest amine nitrogen atom, said amine having at least one hydrogen atom directly linked to an amino nitrogen atom, and containing less than 32 carbon atoms per nitrogen-attached hydrocarbon group; said acid containing less than 10 carbon atoms and free from vinyl radicals; said polymer being mixed with said lubricating oil in an amount within the range of .025% to about 5%.

2. A composition of matter, as defined in claim 1, wherein all radicals attached to the amine nitrogen atom are aliphatic radicals.

3. A composition of matter, as defined in claim 1, wherein all radicals attached to the amino nitrogen atom are straight chain aliphatic radicals.

4. A composition of matter, as defined in claim 1, wherein the amine contains a single amino nitrogen atom and all radicals attached to said amino nitrogen atom are straight chain aliphatic radicals.

5. A composition of matter, as defined in claim 1, wherein the amine contains a single amino nitrogen atom; all radicals attached to said amino nitrogen atom are straight chain aliphatic radicals, and the alpha-beta, monoethylenic acid is dicarboxy.

6. A composition of matter, as defined in claim 1, wherein the amine contains a single amino nitrogen atom; all radicals attached to said amino nitrogen atom are straight chain aliphatic radicals, and the alpha-beta, monoethylenic carboxy acid is maleic acid.

7. A composition of matter, as defined in claim 1, wherein the amine contains a single amino nitrogen atom; all radicals attached to said amino nitrogen atom are straight chain aliphatic radicals, and the alpha-beta, monoethylenic carboxy acid is fumaric acid.

8. A composition of matter, as defined in claim 1, wherein the amine contains a single amino nitrogen atom; all radicals attached to said amino nitrogen atom are straight chain aliphatic radicals, and the alpha-beta, monoethylenic carboxy acid is citraconic acid.

CHARLES M. BLAIR, Jr.